United States Patent
Tsukamoto et al.

(10) Patent No.: US 11,036,117 B2
(45) Date of Patent: Jun. 15, 2021

(54) LENS DEVICE AND IMAGING DEVICE

(71) Applicant: SZ DJI TECHNOLOGY CO., LTD, Shenzhen (CN)

(72) Inventors: Chihiro Tsukamoto, Shenzhen (CN); Futoshi Iinuma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/536,748

(22) Filed: Aug. 9, 2019

(65) Prior Publication Data

US 2019/0361324 A1    Nov. 28, 2019

Related U.S. Application Data

(63) Continuation of application No. PCT/CN2019/079256, filed on Mar. 22, 2019.

(30) Foreign Application Priority Data

Mar. 22, 2018   (JP) .............................. JP2018-055271

(51) Int. Cl.
*G03B 17/56*   (2021.01)
*G02B 7/02*    (2021.01)

(52) U.S. Cl.
CPC .............. *G03B 17/565* (2013.01); *G02B 7/02* (2013.01)

(58) Field of Classification Search
None
See application file for complete search history.

(56) References Cited

U.S. PATENT DOCUMENTS

| | | | |
|---|---|---|---|
| 6,570,621 B2 | 5/2003 | Bigler et al. | |
| 6,738,575 B2 | 5/2004 | Kanayama | |
| 7,600,931 B2 | 10/2009 | Chang et al. | |
| 8,714,844 B2 * | 5/2014 | Oikawa | G03B 17/565 |
| | | | 396/530 |
| 9,151,929 B2 * | 10/2015 | Hasegawa | G02B 9/00 |

(Continued)

FOREIGN PATENT DOCUMENTS

| | | |
|---|---|---|
| CN | 2731479 Y | 10/2005 |
| CN | 101236350 A | 8/2008 |

(Continued)

OTHER PUBLICATIONS

Notice of Reasons for Refusal in counterpart Japanese Patent Application No. 2018-055271, mailed by the Japanese Patent Office dated Mar. 5, 2019 (3 pages).

(Continued)

*Primary Examiner* — Clayton E. LaBalle
*Assistant Examiner* — Dennis Hancock
(74) *Attorney, Agent, or Firm* — Finnegan, Henderson, Farabow, Garrett & Dunner, LLP

(57) ABSTRACT

A lens device includes a housing configured to maintain a lens. The lens device also includes a maintaining structure disposed at an exterior surface of the housing surrounding the lens, and configured to detachably maintain a peripheral device. The lens device further includes one or more electric contacts disposed on the exterior surface of the housing between the lens and the maintaining structure, and configured to electrically connect with the peripheral device.

30 Claims, 7 Drawing Sheets

(56) References Cited

U.S. PATENT DOCUMENTS

| | | | | |
|---|---|---|---|---|
| 2009/0109558 A1* | 4/2009 | Schaefer | ............... | G02B 7/02 |
| | | | | 359/827 |
| 2013/0215253 A1* | 8/2013 | Achtel | ............... | G03B 17/08 |
| | | | | 348/81 |
| 2017/0059965 A1* | 3/2017 | Kobayashi | ............ | G03B 17/55 |
| 2017/0168374 A1 | 6/2017 | Lim et al. | | |
| 2018/0012061 A1* | 1/2018 | Nagano | ............ | G06K 9/00228 |
| 2018/0246396 A1* | 8/2018 | Ota | ............... | G03B 17/02 |

FOREIGN PATENT DOCUMENTS

| | | |
|---|---|---|
| CN | 106019775 A | 10/2016 |
| JP | H 0764216 A | 3/1995 |
| JP | 2009288639 A | 12/2009 |
| JP | 2010-160416 | 7/2010 |
| JP | 2011039384 A | 2/2011 |
| JP | 2014-071289 | 4/2014 |
| WO | WO 2014/164518 A1 | 10/2014 |
| WO | WO 2015/136871 A1 | 9/2015 |

OTHER PUBLICATIONS

English-language machine translation of Notice of Reasons for Refusal in counterpart Japanese Patent Application No. 2018-055271 (13 pages).

International Search Report in corresponding International Application No. PCT/CN2019/079256, dated Jul. 2, 2019 (9 pages).

\* cited by examiner

LENS DEVICE AND IMAGING DEVICE

CROSS-REFERENCE TO RELATED APPLICATIONS

This application is a continuation application of International Application No. PCT/CN2019/079256, filed on Mar. 22, 2019, which claims benefit of priority to Japanese Patent Application No. 2018-055271, filed on Mar. 22, 2018, the entire contents of both of which are incorporated herein by reference.

TECHNICAL FIELD

The present disclosure relates to a lens device and an imaging device.

BACKGROUND

Patent Document 1 discloses a lens cover detachably mounted to a camera housing.

Patent Document 1: U.S. Patent Application Publication No. 2017/0168374.

SUMMARY

The technical problem addressed by the present disclosure is to mount various peripheral devices at the periphery of the lens maintained in the housing.

The present disclosure provides a technical solution for addressing the above technical problem.

In accordance with an aspect of the present disclosure, a lens device is provided. The lens device includes a housing configured to maintain a lens. The lens device also includes a maintaining structure disposed at an exterior surface of the housing surrounding the lens, and configured to detachably maintain a peripheral device. The lens device further includes one or more electric contacts disposed on the exterior surface of the housing between the lens and the maintaining structure, and configured to electrically connect with the peripheral device.

In accordance with another aspect of the present disclosure, an imaging device is provided. The imaging device includes a lens device. The lens device includes a housing configured to maintain a lens. The lens device also includes a maintaining structure disposed at an exterior surface of the housing surrounding the lens, and configured to detachably maintain a peripheral device. The lens device further includes one or more electric contacts disposed on the exterior surface of the housing between the lens and the maintaining structure, and configured to electrically connect with the peripheral device. The imaging device also includes an image sensor configured to convert an optical image generated by the lens into an electric signal.

According to one aspect of the present disclosure, various peripheral devices may be mounted at the periphery of the lens maintained in the housing.

In addition, not all features have been listed or described in the above summary of the present disclosure. The sub-combination of the above listed combination of features may also form an aspect of the present disclosure.

DETAILED DESCRIPTION OF THE EMBODIMENTS

Figure 1:
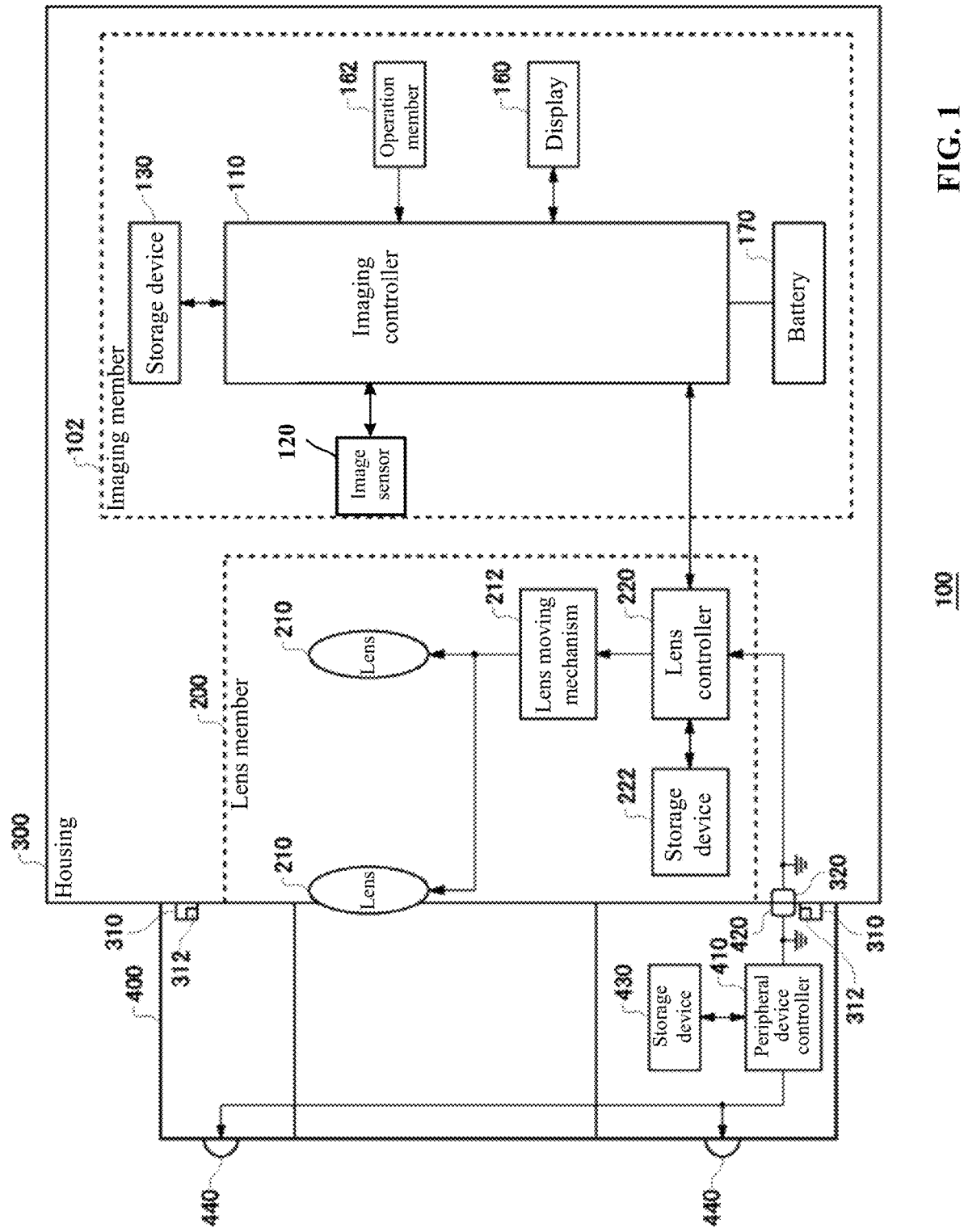
FIG. 1 is a schematic diagram of functional modules of an imaging device, in accordance with an embodiment of the present disclosure.

Next, the present disclosure is described through various embodiments of the present disclosure. The following embodiments do not limit the invention defined by the claims. In addition, not all of the combinations of the features described in the embodiments are necessarily included in the technical solutions of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

It should be understood that in the present disclosure, relational terms such as "first" and "second," etc., are only used to distinguish an entity or operation from another entity or operation, and do not necessarily require or imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

A person having ordinary skills in the art can appreciate that when the term "and/or" is used, the term describes a relationship between related items. The term "A and/or B" means three relationships may exist between the related items. For example, A and/or B can mean A only, A and B, and B only. The symbol "/" means "or" between the related items separated by the symbol. The phrase "at least one of A, B, or C" encompasses all combinations of A, B, and C, such as A only, B only, C only, A and B, B and C, A and C, and A, B, and C. The term "and/or" may be interpreted as "at least one of." The term "communicatively coupled" or "communicatively connected" indicates that related items are coupled or connected through a communication channel, such as a wired or wireless communication channel.

FIG. 1 is a schematic illustration of functional modules of an imaging device 100 provided by the present embodiment. The imaging device 100 may include a housing 300. The housing 300 may maintain an imaging member 102 and a lens member 200. The imaging member 100 may be an example of the lens device. A peripheral device 400 may be detachably disposed in the housing 300. The peripheral device 400 may include a light source 440. The peripheral device 400 may be used for illumination. The peripheral device 400 may receive electric power from a battery 170 provided at the imaging member 102 to drive the light source 440. The peripheral device 400 may include other load other than the light source 440, which may be driven by the electric power received from the battery 170. The peripheral device 400 may be used as an electronic variable neutral density ("ND") filter.

The imaging member 102 may include an image sensor 120, an imaging controller 110, a storage device 130, a display 160, and an operation member 162. The image sensor 120 may be formed by a Charge Coupled Device ("CCD") or a Complementary Metal Oxide Semiconductor ("CMOS"). The image sensor 120 may be configured to convert an optical image formed by multiple lenses 210 into an electrical signal. In some embodiments, the image sensor 120 may output image data of the optical image formed by multiple lenses 210 to an imaging controller 110. The imaging controller 110 may include one or more of a microprocessor such as a Central Processing Unit ("CPU") or a Micro Processing Unit ("MPU"), or a microcontroller such as a Micro Controller Unit ("MCU"). The imaging controller 110 may control the imaging device 100 based on an operation command from the operation member 162. The storage device 130 may be a non-transitory computer-readable medium, and may also include at least one of the flash memories, such as a Static Random Access Memory ("SRAM"), a Dynamic Random Access Memory ("DRAM"), an Erasable Programmable Read-Only Memory ("EPROM"), an Electrically Erasable Programmable Read-Only Memory ("EEPROM"), and a Universal Serial Bus ("USB") storage device. The storage device 130 may store a program implemented by the imaging controller 110 and configured for controlling the image sensor 120. The storage device 130 may be disposed inside the housing 300 of the imaging device 100. The storage device 130 may be detachably disposed on the housing 300. The display 160 may display the image data output by the image sensor 120. The display 160 may display various settings information of the imaging device 100. In some embodiments, the display 160 may be a liquid-crystal display, a touch panel display, etc.

The lens member 200 may include multiple lenses 210, a lens moving mechanism 212, a lens controller 220, and a storage device 222. The multiple lenses 210 may be used as a zoom lens, a varifocal lens, and a focusing lens. At least a portion or all of the multiple lenses 210 may be movably distributed along an optical axis. The lens member 200 may be a replacement lens that may be detachably disposed at the imaging member 102. The lens moving mechanism 212 may be configured to move at least a portion or all of the multiple lenses 210 along the optical axis. The lens controller 220 may drive the lens moving mechanism 212 to move one or more of the multiple lenses 210 based on a lens control command received from the imaging member 102. The lens control command may be a variable focus control command and a focusing control command. The storage device 222 may store one or more control values of the multiple lenses 210 that may be moved by the lens moving mechanism 212.

The imaging device 110 may be provided with a maintaining structure 310 and one or more electric contacts 320. The maintaining structure 310 may be disposed on an exterior surface of the housing 300 disposed surrounding the lens 210, and may detachably maintain the peripheral device 400. The electric contacts 320 may be disposed on the exterior surface of the housing 300 disposed between the lens 210 and the maintaining structure 310, and may be electrically connected with one or more electric contacts 420 of the peripheral device 400. The electric contacts 320 may be disposed at locations that contact the electric contacts 420 of the peripheral device 400 maintained by the maintaining structure 310.

The maintaining structure 310 may be configured to slide or rotate the peripheral device 400 relative to an exterior surface of the housing 300, thereby detaching or mounting the peripheral device 400 relative to the housing 300. The maintaining structure 310 may include a sliding or rotating structure. Such a structure may detach or mount the peripheral device 400 relative to the housing 300.

The imaging device 100 may include multiple electric contacts 320. The multiple electric contacts 320 may be disposed on the exterior surface of the housing 300 along a sliding direction or a rotating direction of the peripheral device 400. The peripheral device 400 may include a light source 400 as a load. The electric power from the battery 170 may be provided to the load through the electric contacts 320. The light source 440 may be, for example, an LED.

The peripheral device 400 may include a peripheral device controller 410 and a storage device 430. The peripheral device controller 410 may be configured to control the driving of the light source 440. The peripheral device controller 410 may be an IC chip such as an LED driving device. The storage device 430 may be configured to store a program for the peripheral device controller 410 to drive the light source 440, etc.

The peripheral device 400 may cover the lens 210. The peripheral device may cover an exposed portion of the lens 210 that is exposed out of the housing 300. The peripheral device 400 may be used as a lens cover. The peripheral device may seal the exposed portion of the lens 210 that is exposed out of the housing 300 through a space between an interior surface of the peripheral device 400 and the exterior surface of the housing 300. The maintaining structure 310 may include a sealing component 312. The sealing component 312 may be a pad made of an elastic material such as silicone.

Figure 2:
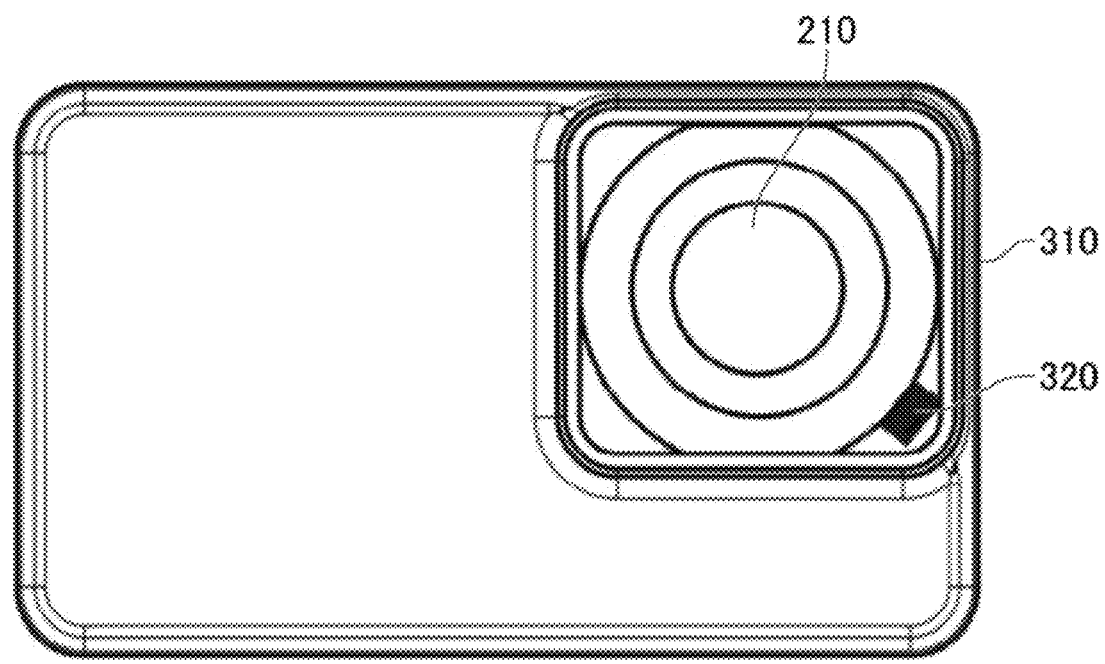
FIG. 2 is a schematic illustration of the imaging device to show a positional relationship between a lens, a maintaining structure, and electric contacts, in accordance with an embodiment of the present disclosure.
Figure 3:
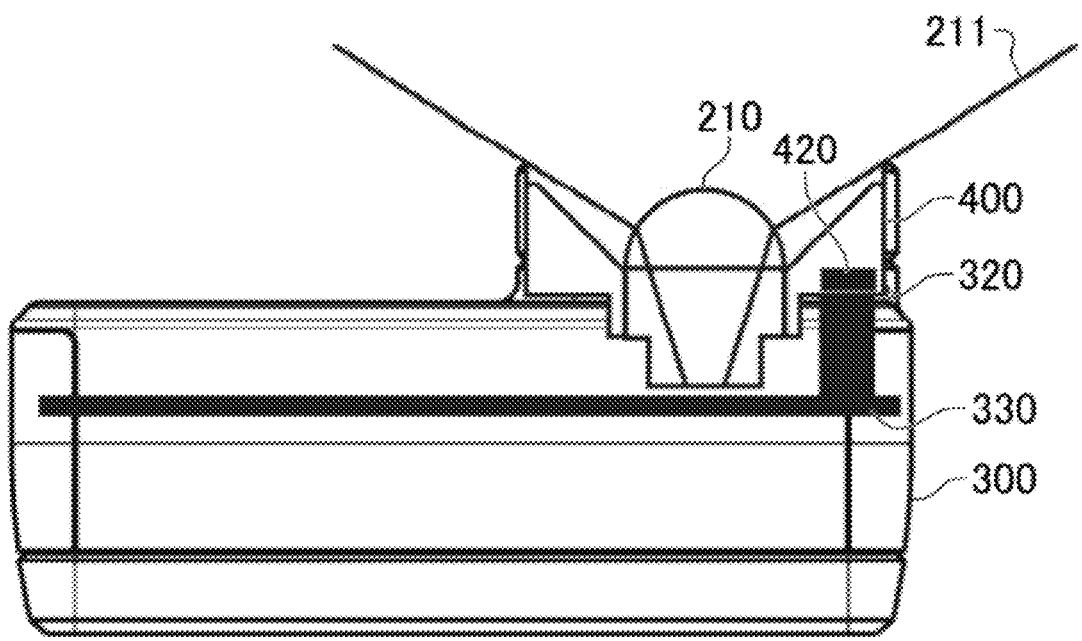
FIG. 3 is another schematic illustration of the imaging device to show the positional relationship between the lens, the maintaining structure, and the electric contacts, in accordance with an embodiment of the present disclosure.

FIG. 2 and FIG. 3 are schematic illustrations of the imaging device 100 to show the positional relationship between the lens 210, the maintaining structure 310, and the electric contacts 320. FIG. 2 is a schematic illustration of the imaging device 100 viewed from the front side. FIG. 3 is a schematic cross-sectional view of the imaging device 100. The electric contacts 320 may be disposed on the exterior surface of the housing 300 disposed between the lens 210 and the maintaining structure 310. The housing 300 may maintain a substrate 330. The electric contacts 320 electrically connected with the substrate 330 may protrude from the exterior surface of the housing 300. The electric contacts 320 may contact the electric contacts 420 included in the peripheral device 400 when the peripheral device 400 is maintained by the maintaining structure 310.

The electric contacts 320 may be disposed at a location such that the electric contacts 320 do not interfere with the light incident on the lens 210. As shown in FIG. 3, the electric contacts 320 may be disposed at a location such that the electric contacts 320 do not interfere with a light beam 211 incident onto the lens 210.

Figure 4:
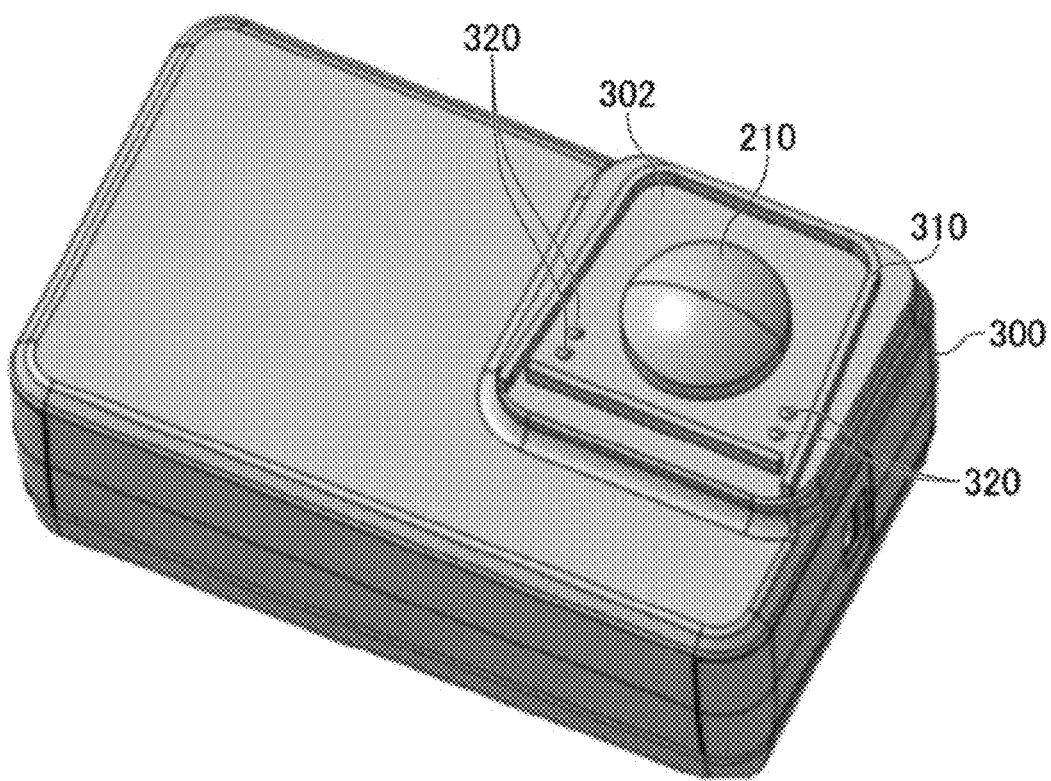
FIG. 4 is a perspective view of the appearance of the imaging device with the peripheral devices detached, in accordance with an embodiment of the present disclosure.

FIG. 4 shows a perspective view of the appearance of the imaging device 100 when the peripheral device 400 is detached. The housing 300 may maintain the lens 210 on an exterior surface 302 of the housing 300 when a portion of the lens 210 is exposed. The maintaining structure 310 may be disposed on the exterior surface 302 that surrounds the lens 210, to surround the lens 210. The multiple electric contacts 320 may be disposed on the exterior surface 302 of the housing 300 surrounding the lens 210 and on an inner side of the maintaining structure 310. The multiple electric contacts 320 may be electrically connected with the multiple electric contacts 420 included in the peripheral device 400 that is detachably maintained in the maintaining structure 310.

Figure 5:
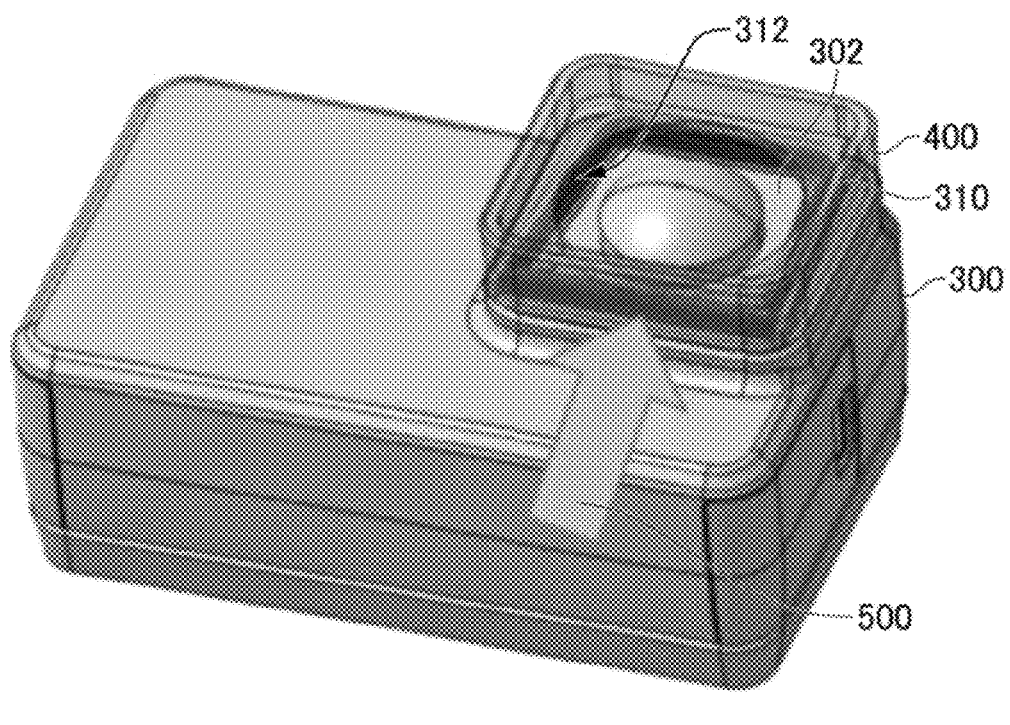
FIG. 5 is a perspective view of the appearance of the imaging device, in accordance with an embodiment of the present disclosure.

As shown in FIG. 5, the peripheral device 400 may slide along the direction indicated by an arrow 500 relative to the exterior surface 302 of the housing 300 while maintaining in the maintaining structure 310. Because the sealing component 312 for sealing the lens 210 may be disposed between a part of the peripheral device 400 that snap-fits with the maintaining structure 310 and the maintaining structure 310. The sealing component 312 may be disposed on the housing 300 side or the peripheral device 400 side.

Figure 6A:
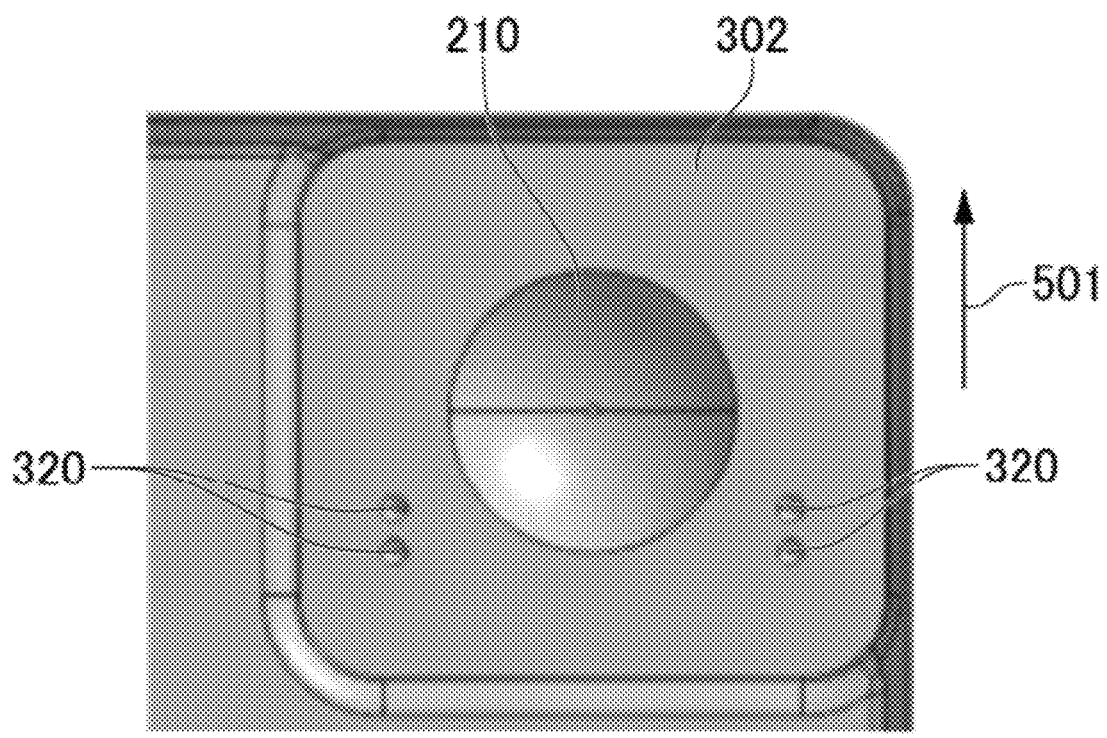
FIG. 6A is a schematic illustration of the distribution of the electric contacts, in accordance with an embodiment of the present disclosure.
Figure 6B:
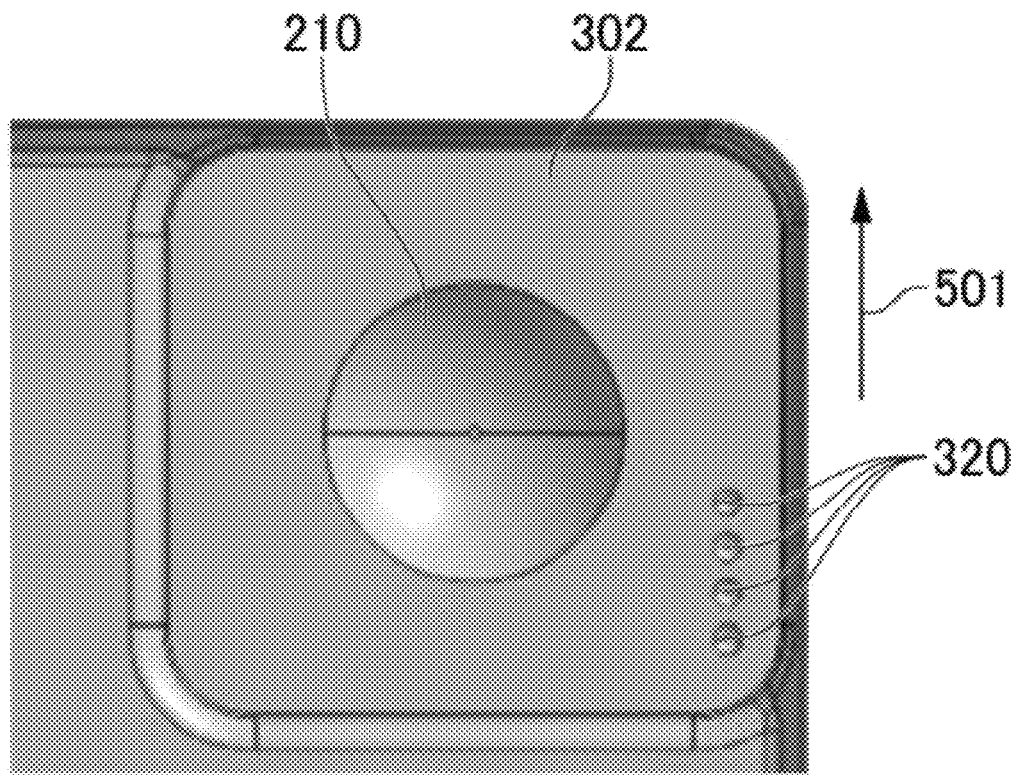
FIG. 6B is a schematic illustration of the distribution of the electric contacts, in accordance with another embodiment of the present disclosure.

The multiple electric contacts 320 may be distributed in a direction in which the peripheral device 400 moves when mounted to the maintaining structure 310. For example, when the peripheral device 400 is slidably mounted to the maintaining structure 310, as shown in FIG. 6A, the multiple electric contacts 320 may be disposed on the exterior surface 302 of the housing 300 along a sliding direction 501. As shown in FIG. 6B, four electric contacts 320 may be disposed on the exterior surface 302 along the sliding direction 501.

Figure 6C:
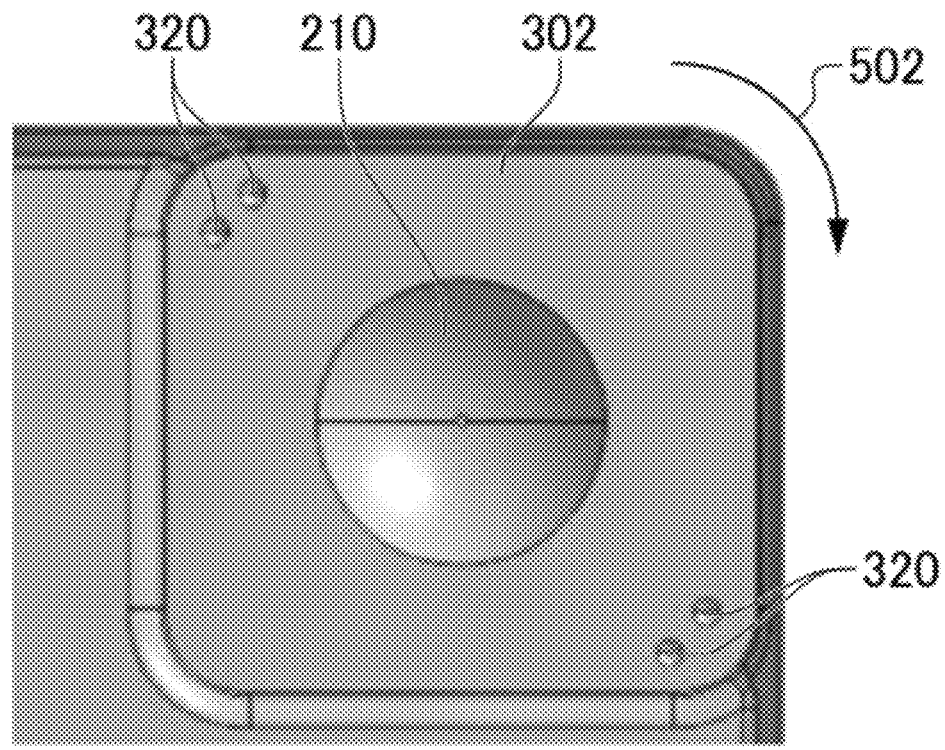
FIG. 6C is a schematic illustration of the distribution of the electric contacts, in accordance with another embodiment of the present disclosure.
Figure 6D:
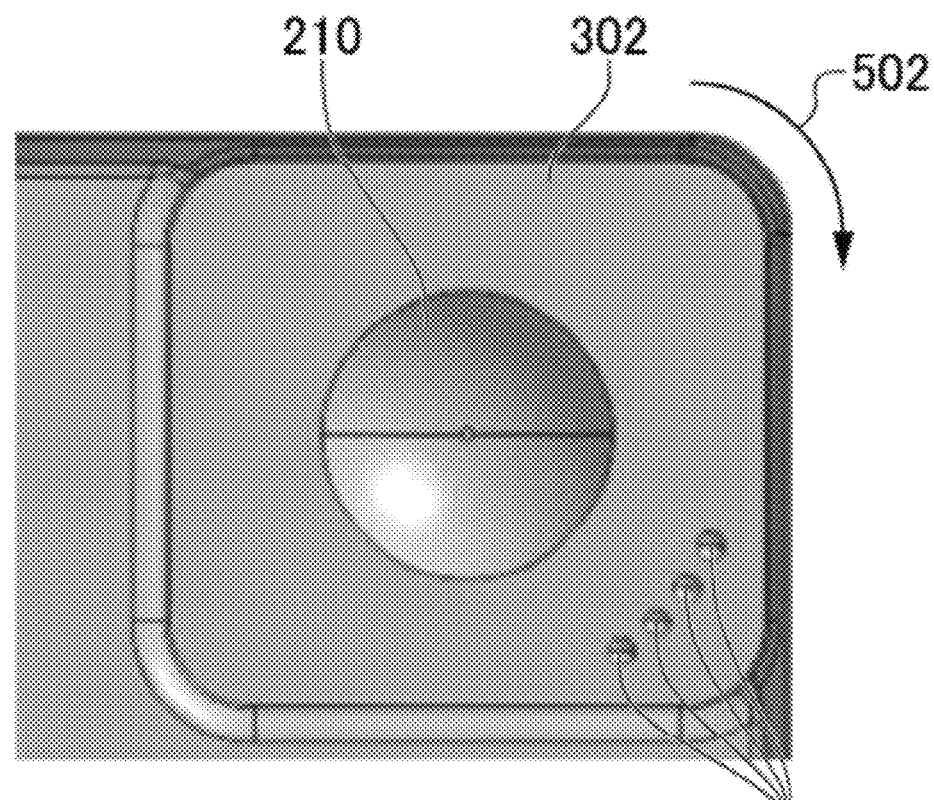
FIG. 6D is a schematic illustration of the distribution of the electric contacts, in accordance with another embodiment of the present disclosure.

In some embodiments, when the peripheral device 400 is rotatably mounted to the maintaining structure 310, as shown in FIG. 6C, the multiple electric contacts 320 may be disposed on the exterior surface 302 of the housing 300 along a rotating direction 502. For example, two electric contacts 320 may be disposed on the exterior surface 302 along the rotating direction 502 separated by the lens 210. As shown in FIG. 6D, four electric contacts 320 may be disposed on the exterior surface 302 along the rotating direction 502.

Figure 6E:
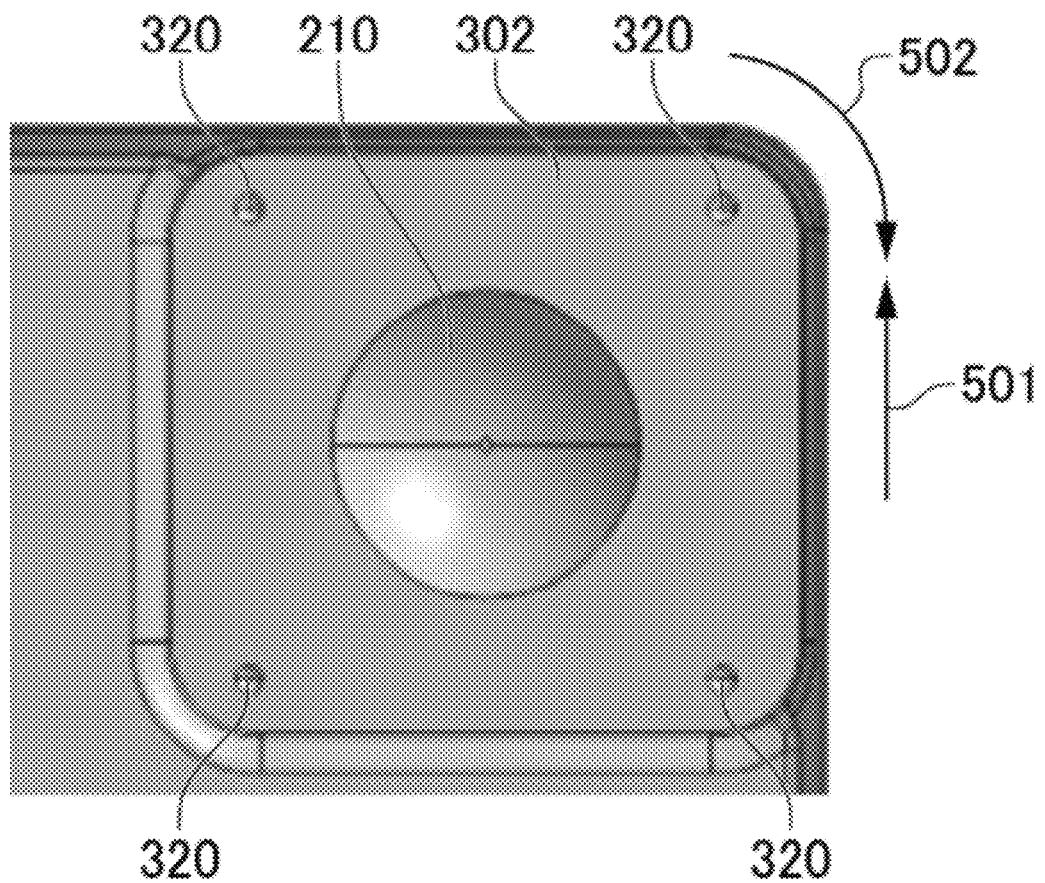
FIG. 6E is a schematic illustration of the distribution of the electric contacts, in accordance with another embodiment of the present disclosure.

As shown in FIG. 6E, four electric contacts 320 may be disposed at the four corners respectively. In this configuration, the peripheral device 400 may move along the sliding direction 501 or the rotating direction 502 to mount on the maintaining structure 310.

As such, the multiple electric contacts 320 may be distributed along a moving direction in which the peripheral device 400 is mounted to the maintaining structure 310, thereby keeping the scratch to a minimum level, which may be generated at the exterior surface 302 by the electric contacts 420 of the peripheral device 400 sliding or rotating relative to the exterior surface 302.

In the imaging device 100 of the present disclosure, the electric contacts 320 may be disposed on the exterior surface 302 of the housing 300 that is located at the outer side of the lens 210 and the inner side of the maintaining structure 310. Therefore, the connection between the electric contacts 420 of the peripheral device 400 mounted to the maintaining structure 310 and the electric contacts 320 may be realized through the maintaining structure 310 to which the peripheral device 400 is mounted. Because the electric contacts 320 are disposed at an inner side of the maintaining structure 310, the peripheral device 400 may cover and seal the lens 210. In the meantime, the connection portion between the electric contacts 420 and the electric contacts 320 may be similarly sealed. That is, by mounting the peripheral device 400 to the maintaining structure 310, the lens 210 and the connection portion between the electric contacts 420 and the electric contacts 320 may be protected from being affected by the external environment.

The present disclosure is described through the above embodiments. However, the technical scope of the present disclosure is not limited to the scope described in the above embodiments. A person having ordinary skills in the art can modify or improve the above embodiments. It is evident from the descriptions of the claims, such modified or improved embodiments are also included in the technical scope of the present disclosure.

It should be noted that the execution sequence of various processes, such as actions, orders, steps, and phases in the device, system, program, and method illustrated in the claims, specification, and drawings accompanying the specification may be realized in any sequence as long as that is no express indicators such as "before," "a priori," etc., and as long as an output of a prior process is not used in a latter process. Regarding the claims, specification, and flow charts included in the drawings accompanying the specification, for the convenience, terms such as "first," and "next" have been used in the descriptions. But these terms do not necessarily indicate that the method is executed in the described sequence.

DESCRIPTION OF NUMERICAL REFERENCES 100 imaging device
102 imaging member 110 imaging controller
120 image sensor
130 storage device
160 display
162 operation member
170 battery
200 lens member
210 lens
211 light beam
212 lens moving mechanism
220 lens controller
222 storage device
300 housing
302 exterior surface
310 maintaining structure
312 sealing component
320 electric contacts
330 substrate
400 peripheral device
410 peripheral device controller
420 electric contacts
430 storage device
440 light source

What is claimed is:

1. A lens device, comprising:
a housing configured to maintain a lens, the lens being configured to let incident light pass through to an image sensor, wherein the image sensor and a first portion of the lens are disposed within the housing and a second portion of the lens protrudes out of the housing;
a maintaining structure disposed at an exterior surface of the housing and surrounding the second portion of the lens, the maintaining structure being configured to detachably maintain a peripheral device comprising a light source; and
one or more electric contacts disposed on the exterior surface of the housing between the lens and the maintaining structure and configured to electrically connect with the peripheral device.

2. The lens device of claim 1, wherein the one or more electric contacts are disposed at one or more locations that contact one or more electric contacts of the peripheral device maintained by the maintaining structure.

3. The lens device of claim 2, wherein the maintaining structure detaches or mounts the peripheral device relative to the exterior surface of the housing through sliding or rotating the peripheral device relative to the exterior surface of the housing.

4. The lens device of claim 3, wherein
the one or more electric contacts comprise multiple electric contacts, and the multiple electric contacts are disposed on the exterior surface of the housing along a sliding direction or a rotating direction of the peripheral device.

5. The lens device of claim 3, wherein the peripheral device comprises:
a load to which an electric power is provided through the one or more electric contacts.

6. The lens device of claim 5, wherein the peripheral device covers the lens.

7. The lens device of claim 3, wherein the peripheral device covers the lens.

8. The lens device of claim 7,
wherein the peripheral device seals the second portion of the lens protruding out of the housing with a sealing component that seals a space between an interior surface of the peripheral device and the exterior surface of the housing,
wherein a periphery of the maintaining structure is disposed outside a periphery of the second portion of the lens protruding out of the housing, and
wherein the sealing component coincides with the periphery of the maintaining structure.

9. The lens device of claim 2, wherein the peripheral device comprises:
a load to which an electric power is provided through the one or more electric contacts.

10. The lens device of claim 9, wherein the peripheral device covers the lens.

11. The lens device of claim 2, wherein the peripheral device covers the lens.

12. The lens device of claim 11,
wherein the peripheral device seals the second portion of the lens protruding out of the housing with a sealing component that seals a space between an interior surface of the peripheral device and the exterior surface of the housing,
wherein a periphery of the maintaining structure is disposed outside a periphery of the second portion of the lens protruding out of the housing, and
wherein the sealing component coincides with the periphery of the maintaining structure.

13. The lens device of claim 1, wherein the maintaining structure detaches or mounts the peripheral device relative to the exterior surface of the housing through sliding or rotating the peripheral device relative to the exterior surface of the housing.

14. The lens device of claim 13, wherein
the one or more electric contacts comprise multiple electric contacts, and
the multiple electric contacts are disposed on the exterior surface of the housing along a sliding direction or a rotating direction of the peripheral device.

15. The lens device of claim 13, wherein the peripheral device comprises:
a load to which an electric power is provided through the one or more electric contacts.

16. The lens device of claim 15, wherein the peripheral device covers the lens.

17. The lens device of claim 13, wherein the peripheral device covers the lens.

18. The lens device of claim 17,
wherein the peripheral device seals the second portion of the lens protruding out of the housing with a sealing component that seals a space between an interior surface of the peripheral device and the exterior surface of the housing,
wherein a periphery of the maintaining structure is disposed outside a periphery of the second portion of the lens protruding out of the housing, and
wherein the sealing component coincides with the periphery of the maintaining structure.

19. The lens device of claim 1, wherein the peripheral device comprises:
a load to which an electric power is provided through the one or more electric contacts.

20. The lens device of claim 19, wherein the peripheral device covers the lens.

21. The lens device of claim 20,
wherein the peripheral device seals the second portion of the lens protruding out of the housing with a sealing component that seals a space between an interior surface of the peripheral device and the exterior surface of the housing, wherein a periphery of the maintaining structure is disposed outside a periphery of the second portion of the lens protruding out of the housing, and wherein the sealing component coincides with the periphery of the maintaining structure.

22. The lens device of claim 1, wherein the peripheral device covers the lens.

23. The lens device of claim 22, wherein the peripheral device seals the second portion of the lens protruding out of the housing with a sealing component that seals a space between an interior surface of the peripheral device and the exterior surface of the housing, wherein a periphery of the maintaining structure is disposed outside a periphery of the second portion of the lens protruding out of the housing, and wherein the sealing component coincides with the periphery of the maintaining structure.

24. The lens device of claim 23, wherein the maintaining structure comprises the sealing component.

25. The lens device of claim 23, wherein the housing maintains the second portion of the lens on the exterior surface of the housing.

26. The lens device of claim 23, wherein the maintaining structure is disposed on the exterior surface so as to surround the second portion of the lens.

27. The lens device of claim 1, wherein the housing maintains the second portion of the lens on the exterior surface of the housing.

28. The lens device of claim 1, wherein the maintaining structure is disposed on the exterior surface so as to surround the second portion of the lens.

29. An imaging device, comprising:
a lens device comprising:
a housing configured to maintain a lens;
a maintaining structure disposed at an exterior surface of the housing and surrounding a second portion of the lens, the maintaining structure being configured to detachably maintain a peripheral device;
one or more electric contacts disposed on the exterior surface of the housing between the lens and the maintaining structure and configured to electrically connect with the peripheral device; and
an image sensor configured to convert an optical image generated by the lens into an electric signal,
wherein the image sensor and a first portion of the lens are disposed within the housing and the second portion of the lens protrudes out of the housing; and
the peripheral device configured to detachably connect to the maintaining structure, the peripheral device comprising a light source.

30. The imaging device of claim 29, wherein the housing comprises the image sensor.

* * * * *